United States Patent [19]

Schael

[11] 4,100,591
[45] Jul. 11, 1978

[54] ILLUMINATION UNIT FOR MICROFILM READERS

[76] Inventor: Rudi Schael, Kandinskystr. 27, D-8 Munchen 71, Fed. Rep. of Germany

[21] Appl. No.: 652,394

[22] Filed: Jan. 26, 1976

[30] Foreign Application Priority Data

Jan. 28, 1975 [DE] Fed. Rep. of Germany ....... 2503379

[51] Int. Cl.² .................... F21L 7/00; F21V 13/02; F21V 23/04
[52] U.S. Cl. .................................. 362/190; 362/285; 362/296; 362/343; 362/394
[58] Field of Search ............... 240/2 AT, 2 M, 2 MA, 240/10.65, 10.66; 353/87; 352/129; 40/106.1, 152.2; 350/145, 238, 241, 75; 362/89, 190, 191, 197, 200, 220, 285, 296, 343, 344, 388, 394, 457

[56] References Cited

U.S. PATENT DOCUMENTS

| 3,389,636 | 6/1968  | Weitzner et al. | 350/145   |
|-----------|---------|-----------------|-----------|
| 3,547,533 | 11/1965 | Stokes et al.   | 355/3 R   |
| 3,609,344 | 7/1971  | Hung So         | 240/10.66 |
| 3,817,610 | 6/1974  | Skinner et al.  | 352/129   |
| 4,012,110 | 3/1977  | Schael et al.   | 350/75    |

FOREIGN PATENT DOCUMENTS 2,120,329  11/1971  Fed. Rep. of Germany.

Primary Examiner—L. T. Hix
Assistant Examiner—William B. Perkey
Attorney, Agent, or Firm—Hauke & Patalidis

[57] ABSTRACT

An illumination unit for microfilm viewers, and more particularly for microfilm viewers of the binocular-microscope type, providing illumination of the microfilm by a light source disposed either on the outside of the viewer or incorporated in the viewer, such that operation of the viewer does not depend on an outside source of light energy or electrical energy.

7 Claims, 3 Drawing Figures

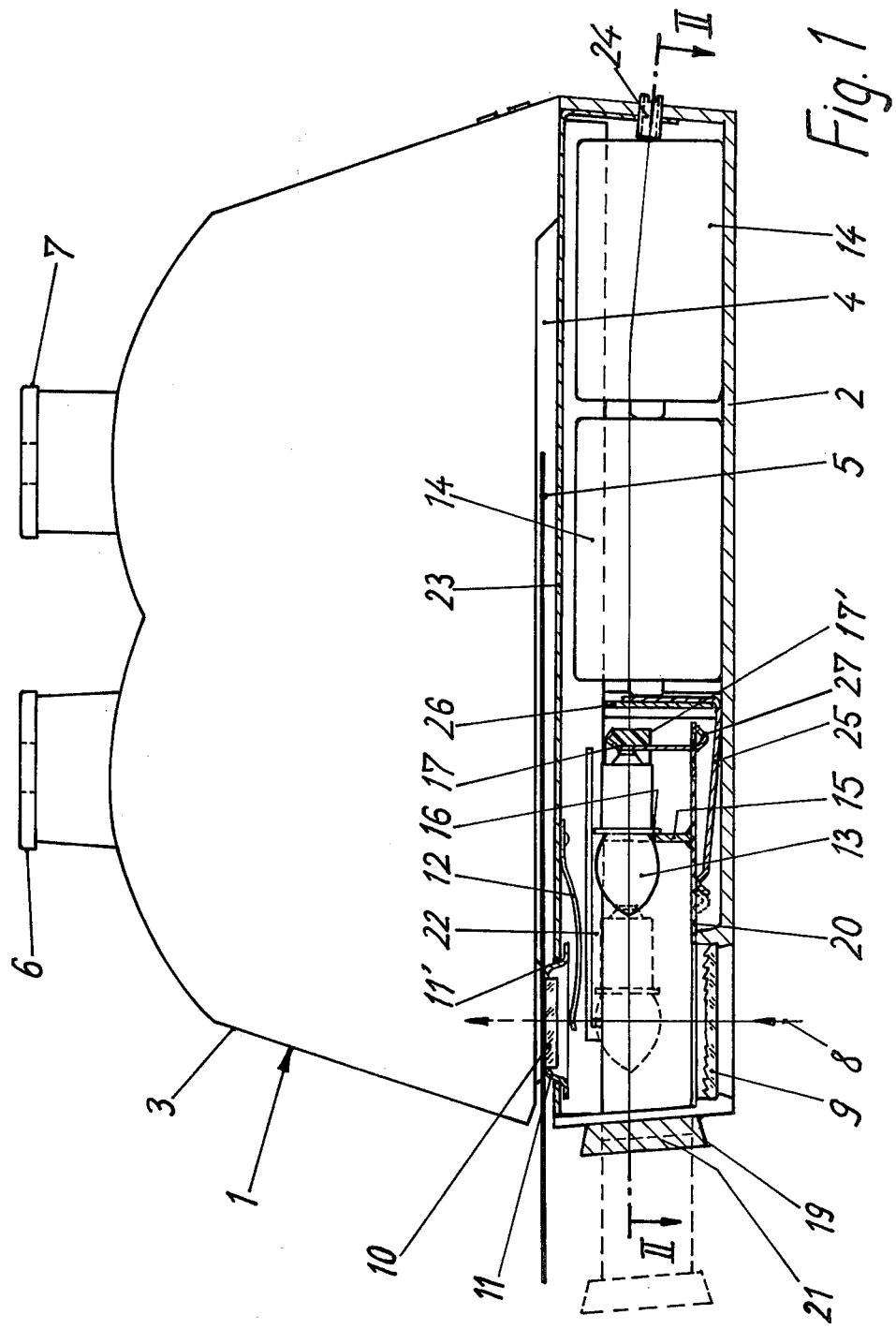

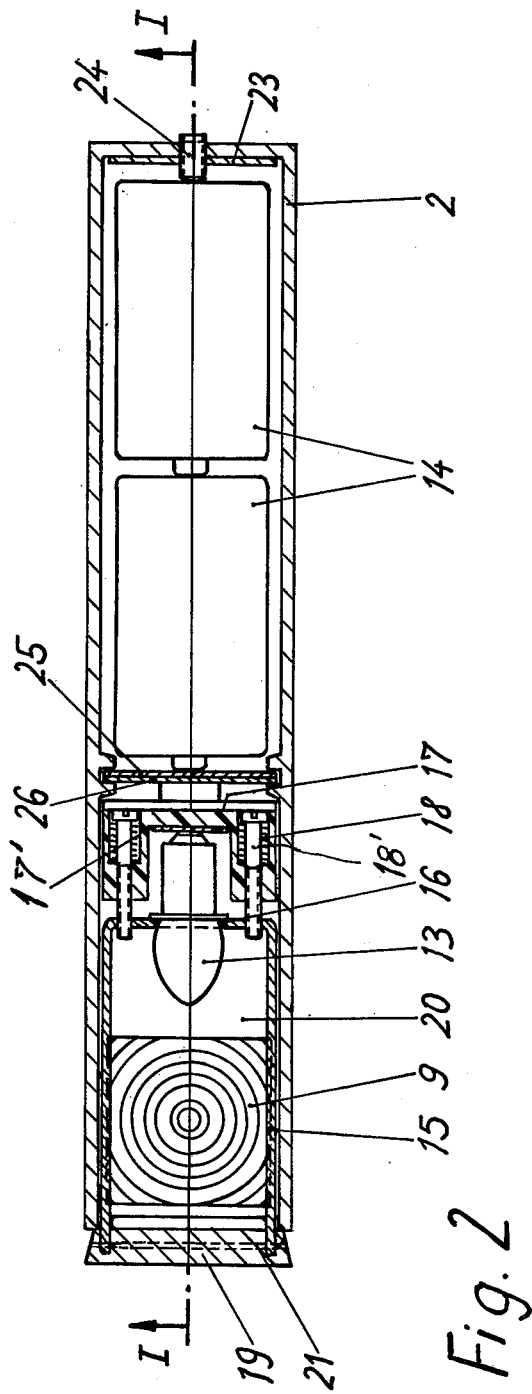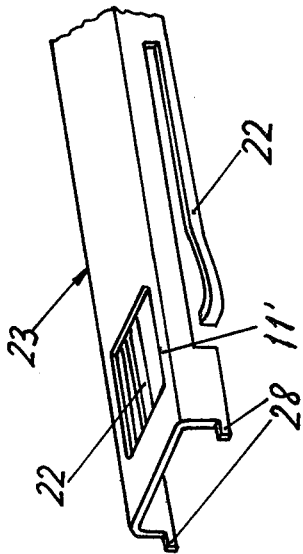

ILLUMINATION UNIT FOR MICROFILM READERS

CROSS-REFERENCE TO RELATED APPLICATION

The present application is related to application Ser. No. 652,393, filed on the same date as the present application and now U.S. Pat. No. 4,012,110, issued Mar. 15, 1977 for Binocular Optical Apparatus With Adjustable Interocular Distance, Particularly for Microfilm Viewers.

BACKGROUND OF THE INVENTION

Apparatus for reading microfilm or michofiche, also generally known as microfilm readers or viewers, permit to magnify printed or illustrated documentation and other material stored in a considerably reduced size as compared to the original size, such as files, catalogs, documents and other data of varied sorts, such that they are reproduced in a readable format.

The use of microfilm and the like and of the accompanying reproduction equipment accomplishes the result of greatly reduced space requirements for storage of the information data as well as improved speed of access to the information. Most of the microfilm reading units presently on the market are of the rear projection screen type. Such viewers are provided with an incandescent lamp with an appropriate optical condenser system for illuminating the microfilm with intense light, with an objective lens system for enlarging the image in focus and projecting the image on the translucent rear surface of a projection screen. In this manner, the image projected on the translucent screen is viewed through the screen. An enlargement to at least 70% of the original size is necessary to reproduce the information stored on the microfilm to a readable format without eye strain. This, in turn, necessitates the use of a screen of such dimension that microfilm readers are generally in the form of table models, resulting in a corresponding large space requirement. Portable microfilm readers have been developed which are even collapsible in some cases. Even when collapsible, portable units are relatively large and heavy and they require a multiplicity of handles for their operation. A further disadvantage of conventional microfilm reading units is that ambient lighting decreases considerably the contrast of the image on the screen. A particular disadvantage of conventional microfilm readers is that they are dependent, as a rule, on electrical current outlets.

In order to alleviate some of those disadvantages, smaller pocket viewers have been designed which function according to a magnifying glass principle using daylight or lamps and batteries for illumination of the microfilm. Such microfilm viewers, however, are monocular and are limited in their applications to a magnification of about 24X. In German Pat. No. 1,907,975 there is disclosed a microfilm viewer of this type of means of which the user merely views an illuminated transparency through a simple lens. The transparency is illuminated by means of an electric light bulb disposed behind the transparency, and which is mounted on a separate portion of the housing designated as the housing bottom. If the "bottom" of the housing, including the light bulb and the batteries, is removed, light is allowed to enter through the opening for illumination of the transparency. Consequently, in the apparatus disclosed in the aforesaid German patent, a change from internal to external illumination of the transparency and vice versa, necessitates a regular dismantling and reassembling of the housing of the transparency viewing unit. In addition, in such an arrangement as the one described, daylight impinges simply and directly upon the transparency. Therefore, when daylight illumination is used, sufficient illumination of the transparency is not always available.

By contrast to the prior art microfilm viewers, the present invention provides a viewer operating according to a microscope principle, i.e., provided with one objective lens system and a pair of eyepieces. A binocular microfilm reader is thus provided in which, to insure greatly improved compactness of the unit, the light beam between the object and the image at the eyepieces is subjected to multiple reflection by means of mirrors. Such an arrangement provides the 45X magnification of the image stored on the microfilm which is a present day requirement. In addition binocular viewing, as compared to monocular viewing, presents the advantage of being far less tiring to the eye and capable of producing an image noticably improved.

German Pat. No. 2,120,329 discloses a microscope in which illumination of the stage is effected by either an external or an internal light source. However, the light must in either case be projected onto the object at a 90° angle by means of a reflecting surface. Furthermore, the light beam provided by the external source is directed in the direction opposite to that of the light beam provided by the internal light source, namely from the side and in a direction perpendicular to the axis of the single eyepiece. Such an arrangement would be particularly disadvantageous in portable microfilm viewers since it is basically difficult to find a laterally located external light source. The stage illumination unit disclosed in the aforesaid German patent, which is arranged for internal as well as external light source, has a V-shaped reflector for deflecting the light at an 90° angle, which must be correctly adjusted to at least two switching positions. Such movable reflectors with a pair of inclined mirrors do not only represent increased manufacturing and assembly costs, but they also cause a decrease in the effectiveness and the trouble-free operation of the illumination unit, and it also makes the general operation of the device during switching from the internal to the external light source much more difficult. Due to the necessary reflection of the impinging light during internal illumination it is necessary, for the purpose of providing sufficient illumination of the stage, to use a light bulb with a built-in condenser, in which the light is radiated mainly in the direction of the reflecting surface facing the light bulb. Such a condensing light bulb, however, is a special bulb which is much more expensive than regular light bulbs and is, in addition, not always readily available on the market. Furthermore, the light from the external source enters the optical system without prior convergence and is only thereafter reflected onto the stage by the second inclined reflector surface. With internal as well as external illumination less than optimal light density falls onto the inclined reflector surfaces which, in turn, do not concentrate the full amount of light which they receive for transmitting to the object. It must also be kept in mind that the inclined reflector surfaces, and especially the one facing the external light source, become relatively dirty in a very short period of time. It is readily apparent that the utilization of the light at the site of the object is less than optimum in quality. Also, operation of the illumination unit as well as correct adjustment of the reflectors and of the condensing light bulb, which obviously requires dealing with intermediate adjustments, is quite difficult, especially in the dark.

The present invention, by contrast, provides an illumination unit for a microfilm reader or viewer working according to a binocular microscope principle and arranged in such a manner that the reader or viewer does not exhibit the aforementioned disadvantages of prior art instruments and, most of all, which in spite of a simple and effective design of the illumination unit has an overall optimum compactness and many other applications.

The present invention provides an illumination unit particularly well suited for illuminating a microfilm in a microfilm viewer based on the binocular microscope principle, which is designed with simplicity in mind and fulfills, through its advantageous arrangement of the various elements, the most sophisticated requirements which modern technology demands of such units. It must first be pointed out that the invention achieves, with particularly simple means, an optimum illumination of the microfilm to be viewed, irrespective of whether an external or an internal light source is used, especially since the light, in both cases, reaches the object without any unnecessary reflection. Consequently, the light obtained from an external light source is concentrated by a focusing and condensing lens in such manner that it is of sufficient density to illuminate a large area of the microfilm to be viewed. In addition, the internal light source may be in the form of an ordinary light bulb. The focusing and condensing lens is in the form of a Fresnel lens, and this also contributes to the compactness of the unit and to its potential for high power magnification. The compactness and the other qualities of the portable viewer according to the present invention gives it a wide variety of applications, for example, at building sites, where a large number of blueprints, parts lists, specifications and other data, previously recorded on microfilm, may be read without any problem. Further applications of the portable viewer of the invention may be found in the technical fields, such as operational units of the army, and like applications. Switching from one type of illumination to the other is particularly simple in the viewer according to the present invention. The advantage provided by mounting the condenser lens in the wall of the viewer housing, whereby light from the internal source is prevented from shining on the outside, is particularly advantageous for military night time operations in which light could result in an immediate discovery of easily identifiable targets. Finally, it will be readily appreciated that operation of the viewer according to the present invention is particularly convenient since the light from an external source reaches the microfilm directly, that is, without any prior reflection. Thus, it is possible to use the portable compact unit in almost the same manner as a pair of field binoculars, and it is readily apparent that an external light source can be found without any difficulty.

U.S. Pat. No. 3,797,917 discloses a transparency viewer utilizing a Fresnel lens through which the user of the viewer sees an enlarged image of the transparency such that as a diapositive or the like. However, the structure does not include a closed housing between the Fresnel lens and the transparency, and no switching from external to internal light source is available for this device. One of the characteristic differences between this device and the present invention is that the Fresnel lens in the transparency viewer of the prior art serves no purpose other than that of a simple magnifying glass, and is disposed between the transparency holder and the observer. By contrast, the Fresnel lens used in the present invention has for funcion to concentrate the light from the external light source onto a scattering or diffusion screen located in front of the microfilm. Consequently, the Fresnel lens is located behind the microfilm relative to an observer of the microfilm.

A further advantage of the present invention results from the internal illumination light bulb being fastened to a U-shaped contact housing attached turn to a pull lever U-shaped handle, the contact housing being provided with a lateral light bulb socket and a spring biased blade electrical contact, with the result that the contact housing, on its upper side, by means of a cover also provided with a contact in the form of a spring action contact arm is electrically connected to one pole of a battery and by pulling out the pull lever handle is automatically connected to the other pole of the battery means of a spring blade contact located beneath the contact housing. This particularly simple switching mechanism permits, through a single pulling action on the pull handle a direct switch from external to internal light source for illumination of the microfilm. In like fashion, the light bulb may be inserted without difficulty into the plug-in socket, whereby a second spring loaded electrical contact is positively pressed against the base terminal of the light bulb.

Advantageously, the contact housing in the switch-on position is stopped by a projection portion engaging a notch in the contact housing. Thus, the switching-on of the light may be effected positively and with safety even in the dark without having to read any position markings. In addition, there is assurance that, especially under adverse conditions, an unvoluntary switching of the internal light cannot take place. A further advantage of the invention is that a cover plate is provided for the condenser lens which engages against an arresting abutment in the housing wall when the contact housing is displaced in the switch on position. In addition, the lens cover is coated, on its side facing the internal light source with a light reflective coating.

This cover plate, coated with a reflective coating, thus forms in a very unique way a reflector of its own, such that upon turning on the internal light bulb an even better illumination of the microfilm is provided. The cover plate, therefore, has a double function.

SUMMARY OF THE PRESENT INVENTION

The present invention accomplishes its objects by providing an illumination system for portable microfilm viewers capable of using either an external light source or an internal light source, and wherein the light emitted by an external light source is projected through a condensing lens disposed in the housing wall, said lens being preferably of the Fresnel lens type, which in turn projects the light directly onto a scattering or diffusion screen disposed in front of the microfilm being read. When the viewer is used with an internal light source for illumination of the microfilm, the light is projected onto the same diffuser screen. A switch unit is provided for direct change from external to internal light sources, a push-pull lever being adapted to displace the internal light bulb in front of the diffuser screen and simultaneously switch on a light bulb, at the same time placing a cover plate in position over the external light condensing lens.

The many objects and advantages of the present invention will become readily apparent to those skilled in the art when the following description of the best mode contemplated for practicing the invention is read in conjunction with the accompanying drawing wherein like reference numerals relate to like parts and in which:

BRIEF DESCRIPTION OF THE DRAWINGS

FIG. 1 is an elevation view of the microfilm viewer according to the present invention with the microfilm illumination portion thereof shown in section to illustrate the internal construction;

FIG. 2 is a section through line II—II of FIG. 1; and

FIG. 3 is a perspective view of the contact cover portion of the present invention.

DETAILED DESCRIPTION OF THE PREFERRED EMBODIMENT

A microfilm viewer according to the present invention as seen at FIG. 1, comprises an enclosure housing 1 consisting of a lower housing portion 2 and an upper housing portion 3, as seen in the drawing, both made preferably of opaque dielectric plastic material. The two housing portions are attached to each other by appropriate fasteners at their right side, as seen in the drawing, and a slot 4 for insertion of a microfilm 5 therethrough is formed between the two portions 2 and 3.

The housing portion 3 accommodates the optical assembly providing magnification of the microfilm 5 as well as a mechanism permitting to adjust the relative position of a pair of eyepieces 6 and 7 to any appropriate eye separation. The magnified microfilm image is viewed by the user of the viewer through the eye-pieces 6 and 7. The optics and the mechanism enclosed in the housing portion 3 form no part of the present invention and may consist preferably of the structure disclosed in U.S. Pat. No. 4,012,110 for "Binocular Optical Apparatus with Adjustable Interocular Distance, Particularly for Microfilm Viewers", filed contemporaneously with the present application. For that reason only the housing portion 2 is shown in section to illustrate the internal construction of the microfilm illumination unit which forms the subject matter of the present invention.

The present invention contemplates that the microfilm 5 may be illuminated, at the option of the user, either by means of an internal light source disposed in the housing portion or by way of an external, completely independent light source. External light, which may be obtained from any convenient source such as, for example, daylight, a desk lamp, or the like, is arbitrarily represented by an arrow 8 and passes through a focusing or condensing lens such as a Fresnel type lens 9 inserted in an aperture in the wall of the housing portion 2, which concentrates the light onto a scattering or diffusion screen 10 disposed in front of the transparent microfilm 5. The light distributed evenly by the diffusion screen 10 illuminates the microfilm 5 at the area where the light impinges on it with the result that an image of the microfilm illuminated area is projected within the housing portion 3, as shown arbitrarily by the dash portion of the arrow 8, for an appropriate optical magnification and reflection to the optical viewing plane of the eyepieces 6 and 7. The diffusion screen 10 is mounted in a frame 11 disposed in an appropriate aperture 11' in the wall of the housing portion 2 freely so as to be urged by means of a leaf spring 12 against the microfilm 5, thus holding the microfilm in position in the viewing aperture. The diffusion screen 10 acts as a pressure plate, but the pressure exerted by the spring 12 is low enough to allow for linear motion of the microfilm 5 when it is desired to index another area for viewing.

Alternatively, the light projected onto the diffusion screem 10 may be, at will, obtained from a light bulb 13 mounted in the housing 2 and supplied in electrical current for example by a pair of batteries 14 also housed in the housing portion 2. As best shown in FIG. 2, the light bulb 13 is plugged into a socket 16 formed in a U-shaped electrically conductive contact housing 15, the socket 16 being formed in the base of the U-shaped contact housing 15 which is mounted on its side such that the light bulb 13 is disposed horizontally, as seen in the drawing. The contact housing 15 is thus electrically connected to the peripheral base terminal of the light bulb 13, the other terminal, disposed at the bottom of the base of the light bulb 13 being engaged with an electrical contact plate 17 urged against the terminal by way of compressed coil springs 18 disposed around the screws 18 freely mounting a U-shaped pressure block 17' made of dielectric material supporting in turn the contact plate 17 relative to the U-shaped contact housing 15.

For direct switching from external to internal illumination of the microfilm 5, a switching device is provided which functions as follows:

A push-pull handle 19, attached to the left hand side as shown in the drawing of the U-shaped contact housing 15 is pulled from the position shown in full line to the position shown in dashed line at FIG. 1, therefore in turn pulling the light bulb 13 from the position shown in full line to the position shown in dashed line immediately opposite the diffusion screen 10, at the same time turning the light bulb 13 on. Simultaneously, a cover plate 20 mounted on the underside of the contact housing 15 is moved over the Fresnel lens 9 such that when the light bulb 13 is turned on, the light emitted by the light bulb is prevented from shining through the Fresnel lens to the exterior of the housing portion 2. Any convenient means may be used for attaching the U-shaped contact housing 15 to the push-pull handle 19 such as, for example, a pin 21. In addition, the contact housing 15 is constantly placed in electrical contact with an end terminal of the batteries 14 by way of the upper edges of the contact housing being in sliding engagement each with a spring tension contact blade 22 mounted on or made integral with a conductive lid contact 23, as may also be seen at FIG. 3, which is provided at its right end, as seen in the drawing, with a metallic set screw 24 which accomplishes the double purpose of holding the contact lid 23 in position in the housing portion 2 while establishing contact with the end terminal of the rightmost one of the batteries 14, further holding the batteries in position by being firmly pressed against the bottom terminal of such right most battery 14. The shape of the spring tension contact blades 22 of the contact lid 23 is best shown at FIG. 3 which illustrates the front end of the contact lid 23 in perspective. The two spring tension contact blades 22 run along the two vertical sides of the contact lid 23 and are shaped preferably integral with the lid by means of a stamping process, and both contact blades 22 are provided with a curvilinear laterally bent over end such as to be springingly engaged, and thus be in electrical contact with the upper front edges of the two sidewalls of the U-shaped contact housing 15 located just below.

As a result of the pulling out of the push-pull handle 19, the contact housing 15 is brought into contact with the other terminal of the batteries 14 by means of a contact spring blade 25 located beneath the contact housing 15. For that purpose, the electrically conductive contact spring blade 25 is held in lateral support grooves formed in the housing portion 2 and is pressed against the terminal of the left most battery 14 by means of a pressure plate 26, and its other end formed as a contact projection is engaged against the nonconductive cover plate 20 which is attached to the lower front side of the U-shaped contact housing 15. When the contact housing 15, as a result of pulling of the push-pull handle 19, is brought into the switch on position (dashed line in FIG. 1) a contact projection 27 at the end of a contact blade 25 integral with or fastened to the contact plate 17 such as to be in electrical contact with the contact plate 17 for the light bulb is displaced to the position indicated by a dashed line at FIG. 1 and, as a result of engagement with the projection on the end of the contact blade 25, closes the battery circuit through the light bulb, and the light bulb 13 is turned on. The light emitted by the light bulb 13, instead of the external light source, impinges upon the diffusion screen 10 and illuminates the microfilm 5, the light being directed in the direction of the arrow 8 toward the interior of the housing portion 3.

After the projecting end of the contact spring blade 25 is snapped into position in engagement against the left side, as seen in the drawing, of the contact projection 27 the switching mechanism is locked in position with the light bulb 13 turned on. A further pulling of the push-pull handle 19 which could cause disengagement of the contact point or projection 27 from the contact point of the projecting end of the contact blade 25 is prevented in the following manner: In the on position of the light bulb 13, the cover plate 20 abuts at its frontal edge against the inner side of the left wall of the housing portion 2 which thus defines a stop abutment. In the off position of the bulb 13, shown as a solid line at FIG. 1, in which the microfilm 5 is illuminated by an external light source, the outer surface of the frontal left side of the housing portion 2 forms an abutment stop for the handle 19.

It should also be mentioned that the cover plate 20 on its surface facing the light bulb 13, is provided with a coating of highly reflective material and thus serves in addition to its covering function as a reflector for the light emitted from the bulb 13 after the latter has been turned on. Also to be mentioned is that (as seen in FIG. 3), the contact lid 23 is provided with end projection 28 which acts as mounting means for the contact lid by being inserted at assembly into corresponding notches on the inner surface of the left wall of the housing portion 2. The rear portion of the contact lid 23 is fastened to the housing portion by means of the set screw 24, as previously mentioned. The wall of the housing portion 2 disposed toward the slot 4 is formed by the base of the contact lid 23 provided with the frame aperture 11' for the diffusion screen 10.

It will be appreciated that the microfilm reader illustrated in the drawing has been shown substantially at a one-to-one scale, which clearly reveals its compact size and, consequently, it is immediately apparent that the invention uses very little material and takes up very little space while still being endowed with sufficient microfilm magnification capabilities. It will also be appreciated that the advantages of the present invention are further enhanced by the fact that a viewer according to the present invention is completely independent from the availability of an electrical outlet for illumination of the microfilm. Due to these advantages as well as due to is light weight, the microfilm viewer of the present invention renders itself especially suitable as a portable microfilm reader with a multiplicity of applications, of which some have been hereinbefore mentioned. The whole optical assembly is fully enclosed in an opaque plastic housing which prevents ambient light from decreasing the contrast of the image.

Having thus described the present invention by way of an example of practical embodiment thereof, modifications whereof will be apparent to those skilled in the art, what is claimed as new is as follows:

1. An illumination device for a microfilm viewer, particularly for a microfilm viewer of the binocular microscope type, wherein the microfilm can be selectively illuminated directly by a light source which is either internal or external independently of each other and wherein the internal light source is independent of an outside source of energy, the improvement comprising a housing permanently attached to the microfilm viewer, a condensing lens disposed in a wall of said housing, a diffusion screen disposed in an opposite wall of said housing along the optical axis of said lens in front of said microfilm, a light bulb and a light bulb support member in said housing displaceable from a first position away from said diffusion screen to a second position placing said light bulb substantially at said optical axis behind said diffusion screen, a push-pull handle displacing said light bulb support member from said first position to said second position, switch means actuated by said push-pull handle for turning on said light bulb in said first position, a cover plate for said lens operated simultaneously by said push-pull handle for uncovering said lens when in said first position and covering said lens when in said second position, and an electrical power supply connected across said light bulb through said switch means.

2. The improvement of claim 1 wherein said lens is a Fresnel type lens.

3. The improvement of claim 1 wherein said electrical power supply is an electric battery disposed in said housing and said light bulb support member is a U-shaped contact housing, said U-shaped contact housing being reciprocable by being attached to said push-pull handle, and comprising mean for continuously connecting said contact housing to a first terminal of said electric battery, said contact housing being electrically connected to a terminal of said light bulb, a second contact in engagement with another terminal of said light bulb, and contact blade means constantly in engagement with the second terminal of said electric battery, each contact blade means being normally disengaged from electric connection with said light bulb second terminal when said light bulb is in said first condition and engaged therewith when said light bulb is in said second position.

4. The improvement of claim 3 further comprising detent means integral with said contact blade means for stopping said contact housing in the switch on position of said light bulb.

5. The improvement of claim 1 wherein said cover plate is improved on a side facing said light bulb with a coating of light reflective material.

6. The improvement of claim 3 wherein said cover plate is provided on a side facing said light bulb with a coating of light reflective material.

7. The improvement of claim 4 wherein said cover plate is provided on a side facing said light bulb with a coating of light reflective material.

* * * * *

UNITED STATES PATENT AND TRADEMARK OFFICE
CERTIFICATE OF CORRECTION

PATENT NO. : 4,100,591
DATED : July 11, 1978
INVENTOR(S) : Rudi Schael

It is certified that error appears in the above–identified patent and that said Letters Patent are hereby corrected as shown below:

Column 5, line 29, after "two" insert --housing--.

Column 6, line 24, delete "18" and insert thereinstead --18'--.

Column 8, line 32, after "bulb" insert --in said second position and turning off said light bulb--.

Column 8, line 61, delete "improved" and insert thereinstead --provided--.

Signed and Sealed this

Thirteenth Day of March 1979

[SEAL]

Attest:

RUTH C. MASON
Attesting Officer

DONALD W. BANNER
Commissioner of Patents and Trademarks